(12) United States Patent
Weeden

(10) Patent No.: US 10,073,468 B2
(45) Date of Patent: Sep. 11, 2018

(54) SYSTEM AND METHOD FOR COOLING AND PROMOTING PHYSICAL ACTIVITY OF POULTRY

(71) Applicant: Weeden Environments Inc., Woodstock (CA)

(72) Inventor: Kevin S. Weeden, New Hamburg (CA)

(73) Assignee: WEEDEN ENVIRONMENTS INC., Woodstock (CA)

( * ) Notice: Subject to any disclaimer, the term of this patent is extended or adjusted under 35 U.S.C. 154(b) by 466 days.

(21) Appl. No.: 14/751,238

(22) Filed: Jun. 26, 2015

(65) Prior Publication Data

US 2015/0293537 A1    Oct. 15, 2015

Related U.S. Application Data

(63) Continuation of application No. 12/704,885, filed on Feb. 12, 2010, now Pat. No. 9,069,362.

(51) Int. Cl.
*A01K 15/02*    (2006.01)
*G05D 7/06*    (2006.01)
(Continued)

(52) U.S. Cl.
CPC ......... *G05D 7/0635* (2013.01); *A01K 45/002* (2013.01); *G05B 15/02* (2013.01); *G05D 23/19* (2013.01); *G05D 23/1931* (2013.01)

(58) Field of Classification Search
CPC .................................. A01K 1/00; A01K 31/18
(Continued)

(56) References Cited

U.S. PATENT DOCUMENTS 3,696,791 A    10/1972 Saurenman et al.
3,889,881 A    6/1975 Cunningham et al.
(Continued)

OTHER PUBLICATIONS

"Weeden Sprinkler System" (Apr. 11, 2005), online: www.weedenenvironments.com <http://web.archive.org/web/20050411112814/http://www.weedenenvironments.com/weeden%20sprinkler.html#weeden> Last Accessed: Jan. 11, 2012.
(Continued)

*Primary Examiner* — Kristen C Hayes
(74) *Attorney, Agent, or Firm* — Bereskin & Parr LLP

(57) ABSTRACT

A sprinkler controller in a poultry house having a processor, a data storage device operatively connected to the processor, the data storage device having instructions for programming the processor, and an input/output module operatively connected to the processor. The input/output module is configured to communicate with at least one valve for controlling a flow of fluid between a fluid source and at least one sprinkler nozzle. The at least one valve has an open position permitting the flow of fluid, and a closed position inhibiting the flow of fluid, and the position of the valve being determined by the processor. The processor is programmed to set the valve in the open position at a start of an activity promotion interval, and to set the valve in the closed position at the end of the activity promotion interval. The duration of the activity promotion interval is selected such that a sufficient amount of fluid is dispersed through the sprinkler nozzle to promote physical activity in the poultry. The start of the activity promotion interval is predetermined based on a frequency of operation parameter indicative of a number of activity promotion intervals in a time period, and a value for the frequency of operation parameter being selected to promote growth of the poultry.

24 Claims, 7 Drawing Sheets

(51) Int. Cl.
*G05D 23/19* (2006.01)
*G05B 15/02* (2006.01)
*A01K 45/00* (2006.01)

(58) Field of Classification Search
USPC ....... 119/416, 420, 421, 436, 437, 458, 475, 119/476
See application file for complete search history.

(56) References Cited

U.S. PATENT DOCUMENTS

| | | | |
|---|---|---|---|
| 3,965,691 A | 6/1976 | Van Huis | |
| 4,476,809 A * | 10/1984 | Bunger | A01K 1/0052 119/14.03 |
| 4,479,809 A | 10/1984 | Bunger | |
| 4,700,887 A * | 10/1987 | Timmons | A01K 1/0047 119/306 |
| 4,773,471 A * | 9/1988 | Grant | A01K 1/0052 119/448 |
| 5,865,143 A | 2/1999 | Moore | |
| 6,073,586 A | 6/2000 | Medlin et al. | |
| 6,705,599 B2 * | 3/2004 | Terrell | A01K 1/0082 119/436 |
| 6,810,832 B2 | 11/2004 | Ford | |
| 6,910,446 B2 | 6/2005 | Johnston, Jr. | |
| 6,997,139 B2 * | 2/2006 | Rapp | A01K 1/0082 119/447 |
| 7,104,220 B1 | 9/2006 | Mack et al. | |
| 7,156,051 B2 * | 1/2007 | Lorton | A01K 1/0052 119/437 |
| 7,360,503 B2 * | 4/2008 | Rapp | A01K 1/0082 119/447 |
| 7,658,165 B2 * | 2/2010 | Lorton | A01K 1/0052 119/437 |
| 7,832,359 B2 * | 11/2010 | Lorton | A01K 1/0052 119/437 |
| 7,966,974 B2 * | 6/2011 | Lorton | A01K 1/0052 119/437 |
| 8,087,386 B2 | 1/2012 | Purswell et al. | |
| 8,181,604 B1 * | 5/2012 | Avila | A01K 1/00 119/448 |
| 8,210,126 B2 * | 7/2012 | Sia | A01K 31/00 119/436 |
| 8,839,555 B2 * | 9/2014 | Wang | A01K 63/00 47/66.6 |
| 2003/0150394 A1 * | 8/2003 | Wolfe | A01K 63/003 119/246 |
| 2007/0051322 A1 * | 3/2007 | Lorton | A01K 1/0052 119/437 |
| 2007/0266957 A1 | 11/2007 | Tozaka et al. | |
| 2012/0255501 A1 * | 10/2012 | Sia | A01K 31/00 119/437 |
| 2013/0305605 A1 * | 11/2013 | Wang | A01K 63/00 47/66.6 |

OTHER PUBLICATIONS

"Cooling Broiler Chickens by Direct Sprinkling" (Winter 2008), Avian Advice, vol. 10, No. 4, p. 10 <http://avianadvice.uark.edu/AA%20PDFs/avianadvice_wi08.pdf> Last Accessed: Jan. 11, 2012.

"Weeden Environments Unveils Next Generation Sprinkler System" (Jan. 28), online: www.canadianpoultrymag.com, < http://www.worldpoultrymag.com/content/view/1604/96> Last Accessed: Jan. 11, 2012.

"New Sprinkler System to Cool Poultry" (Jan. 30, 2009), World Poultry—News, online: www.worldpoultry.net, <http://worldpoultry.net/news/new-sprinkler-system-to-cool-poultry-3536.html> Last Accessed: Jan. 11, 2012.

* cited by examiner

70

FACTORS AFFECTING FREQUENCY AND/OR DURATION OF ACTIVITY PROMOTION INTERVALS

| AMOUNT OF WATER DISPENSED IN A TIME PERIOD |
|---|
| AGE OF THE POULTRY |
| TYPE OF POULTRY BEING HOUSED |
| TIME OF DAY |
| PURPOSE OF THE POULTRY |
| DESIRED WEIGHT OF THE POULTRY |
| SEX OF THE POULTRY |

FIGURE 5

SYSTEM AND METHOD FOR COOLING AND PROMOTING PHYSICAL ACTIVITY OF POULTRY

RELATED APPLICATION

This application is a continuation of U.S. patent application Ser. No. 12/704,885 filed on Feb. 12, 2010, entitled "SYSTEM AND METHOD FOR COOLING AND PROMOTING PHYSICAL ACTIVITY OF POULTRY", the entire contents of which are hereby incorporated by reference herein for all purposes.

FIELD

The invention relates to sprinkler systems, and in particular, to methods and systems for controlling sprinkler systems in poultry houses.

INTRODUCTION

Poultry such as chickens, turkeys, ducks, and geese are a popular food resource. Majority of poultry are raised using various farming techniques, which include free-range as well as intensive farming. A poultry house provides shelter to the poultry during the growth cycle of the poultry. The growth cycle of poultry may differ based on the species of the poultry being farmed. For example, the growth cycle of broiler chicken typically ranges from one-day-old chicks at growth day one to maturity in about six weeks when they are harvested.

Poultry raised in poultry houses lead a generally sedentary lifestyle being in a seated position throughout most of the day. This sedentary lifestyle involves very little physical activity and may not be desirable for growth and/or health reasons.

A controlled amount of physical activity at certain stages in the growth cycle is desirable because the physical activity is conducive to the growth of the poultry. On the other hand, an excessive amount of physical activity is undesirable because it may inhibit growth.

Temperature control in a poultry house is also necessary to prevent mortality of the poultry from excessive ambient temperature. It is desirable to maintain the ambient temperature in the poultry house below a specific threshold.

Accordingly, there is a need for systems and methods for controlling sprinklers in poultry houses, which addresses at least some of the above concerns.

SUMMARY

According to one embodiment of the invention, there is provided a sprinkler controller in a poultry house comprising a processor, a data storage device operatively connected to the processor, the data storage device having instructions for programming the processor, and an input/output module operatively connected to the processor.

The input/output module is configured to communicate with at least one valve for controlling a flow of fluid between a fluid source and at least one sprinkler nozzle. The at least one valve has an open position permitting the flow of fluid, and a closed position inhibiting the flow of fluid, the position of the valve being determined by the processor.

The processor is programmed to set the valve in the open position at a start of an activity promotion interval, and to set the valve in the closed position at the end of the activity promotion interval, a duration of the activity promotion interval being selected such that a sufficient amount of fluid is dispersed through the sprinkler nozzle to promote physical activity in the poultry, the start of the activity promotion interval being predetermined based on a frequency of operation parameter indicative of a number of activity promotion intervals in a time period, and a value for the frequency of operation parameter being selected to promote growth of the poultry.

According to another embodiment of the invention, there is provided a method for promoting activity in poultry in a poultry house. The method comprises electronically setting a valve in an open position to permit fluid to flow through the valve at a start of an activity promotion interval. The valve controls a flow of fluid between a fluid source and at least one sprinkler nozzle directed at the poultry. The method also comprises waiting for a predetermined duration of the activity interval. The duration is selected such that a sufficient amount of fluid is dispersed through the sprinkler nozzle at the poultry to promote physical activity in the poultry without over soaking the poultry house. The method also comprises electronically setting the valve to a closed position to inhibit fluid from flow through the valve at the end of the activity promotion interval to prevent an excessive amount of fluid from being dispersed into the poultry house. The start of the activity promotion interval is predetermined based on a frequency of operation parameter indicative of a number of activity promotion intervals in a time period. The value for the frequency of operation parameter is selected to promote growth of the poultry.

According to another embodiment of the invention, there is provided a sprinkler system for a poultry house having at least one sprinkler nozzle directed at the poultry, a fluid source connected to the at least one sprinkler nozzle, at least one electronically controlled valve connected to the fluid source and the sprinkler nozzle for controlling the flow of fluid. The at least one valve has an open position permitting the flow of fluid, and a closed position inhibiting the flow of fluid. The sprinkler system also includes a controller comprising a processor and a data storage device operatively connected to the processor. The data storage device has instructions to program the processor. The sprinkler system also includes an input/output module operatively connected to the processor. The input/output module is configured to communicate with the at least one valve to set the position of the valve.

The processor in the controller is programmed to set the valve in the open position at a start of an activity promotion interval, and to set the valve in the closed position at the end of the activity promotion interval. The duration of the activity promotion interval being is such that a sufficient amount of fluid is dispersed through the sprinkler nozzle to promote physical activity in the poultry. The start of the activity promotion interval is predetermined based on a frequency of operation parameter indicative of a number of activity promotion intervals in a time period. A value for the frequency of operation parameter is selected to promote growth of the poultry.

According to another embodiment of the invention, there is provided a non-transitory physical computer-readable storage medium upon which a plurality of instructions are stored, the instructions for performing operations comprising electronically setting a valve in an open position to permit fluid to flow through the valve at a start of an activity promotion interval. The valve controlling a flow of fluid between a fluid source and at least one sprinkler nozzle directed at the poultry. The operations also include waiting for a predetermined duration of the activity interval, the duration being selected such that a sufficient amount of fluid is dispersed through the sprinkler nozzle at the poultry to promote physical activity in the poultry without over soaking the poultry house. The operations also include electronically setting the valve to a closed position to inhibit fluid from flow through the valve at the end of the activity promotion interval to prevent an excessive amount of fluid from being dispersed into the poultry house. The start of the activity promotion interval is predetermined based on a frequency of operation parameter indicative of a number of activity promotion intervals in a time period. The value for the frequency of operation parameter being selected to promote growth of the poultry.

DRAWINGS

For a better understanding of the embodiments described herein and to show more clearly how they may be carried into effect, reference will now be made, by way of example only, to the accompanying drawings which show at least one exemplary embodiment, and in which:

FIG. 5 is a table illustrating the factors that may affect frequency and/or duration of activity promotion interval performed by the controller shown in FIG. 1.

Figure 7:
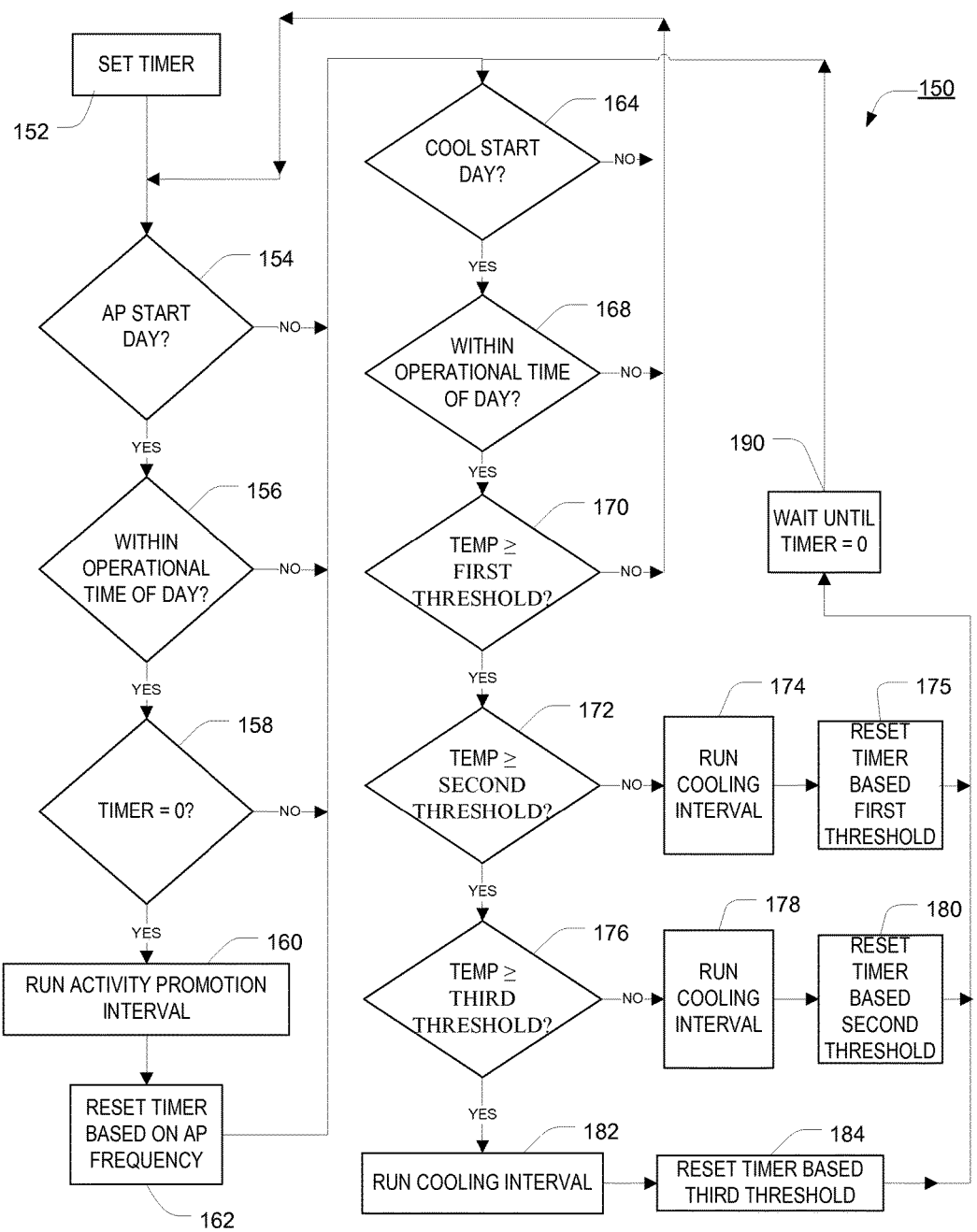

FIG. 7 a block diagram illustrating the steps of a method for promoting activity in poultry according to another embodiment.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or other storage elements), at least one input device, and at least one output device. For example and without limitation, the programmable computers may be a programmable electronic controller, mainframe computer, server, personal computer, laptop, personal data assistant, or cellular telephone. Program code is applied to input data to perform the functions described herein and generate output information. The output information is applied to one or more output devices, in known fashion.

Each program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. read only memory (ROM) or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Figure 1:
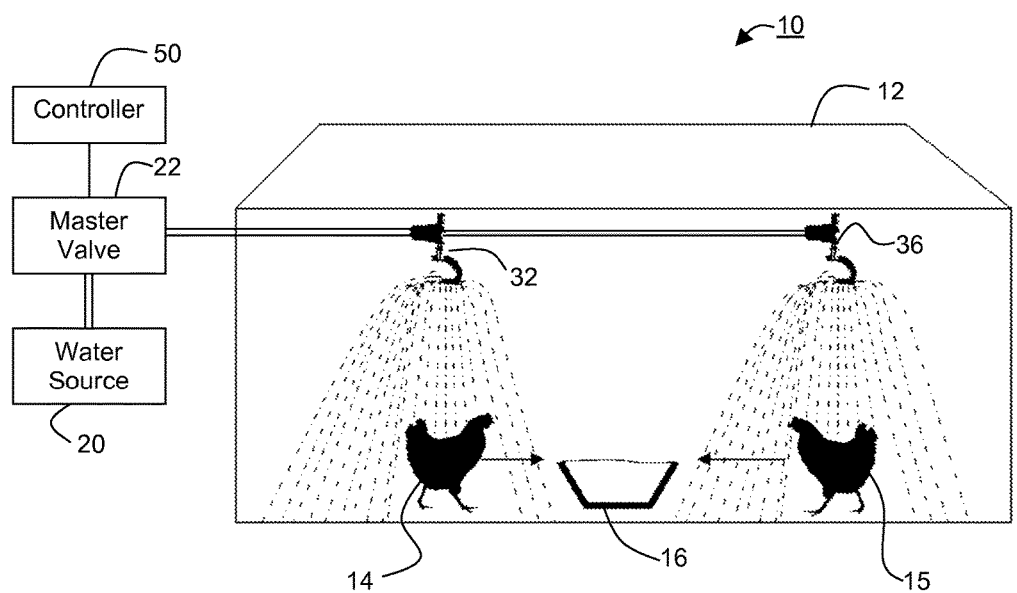
FIG. 1 is a schematic diagram illustrating some components of a system for promoting activity in poultry according to one embodiment.

Referring to FIG. 1, illustrated therein are some components of a system 10 for promoting activity in poultry according to one embodiment of the invention, shown installed in an exemplary poultry house 12. The poultry house 12 is shown housing two chickens 14 and 15, each representative of a multiplicity of chickens. The poultry house 12 is intended for illustrative purposes only. In commercial embodiments, the poultry house 12 may be of other shapes and sizes as known to one skilled in the art, providing shelter to thousands of birds. The commercial poultry houses may also feature artificial lighting conditions to stimulate growth. The poultry houses may also have water delivery system for providing drinking water. In the current embodiment, the poultry house 12 has a water trough 16 as shown. The floor of a poultry house may be covered in litter such as wood shavings, straw or rice hulls.

The poultry house 12 has installed two sprinkler nozzles 32 and 36 directed at the chickens 14 and 15 respectively. While the nozzles 32 and 36 are illustrated to be located at the ceiling of the poultry house 12, they may be placed elsewhere as long as the output from the nozzles are directed at the poultry. The head of the nozzles are configured to produce micro droplets of water such that a desired amount of water may be sprayed into the barn over a time period. This prevents over soaking the poultry as well as the floor of the barn, which may be covered in litter. As shown in FIG. 1, the sprinkler nozzles 32 and 36, when activated, spray a fine mist of water at the chickens 14 and 15. The chickens 14 and 15 react to the spray of water by standing up from the resting position and moving. The chickens 14 and 15 may be prompted to move towards the water trough 16 to have a drink of water from the water trough as indicated.

Figure 2:
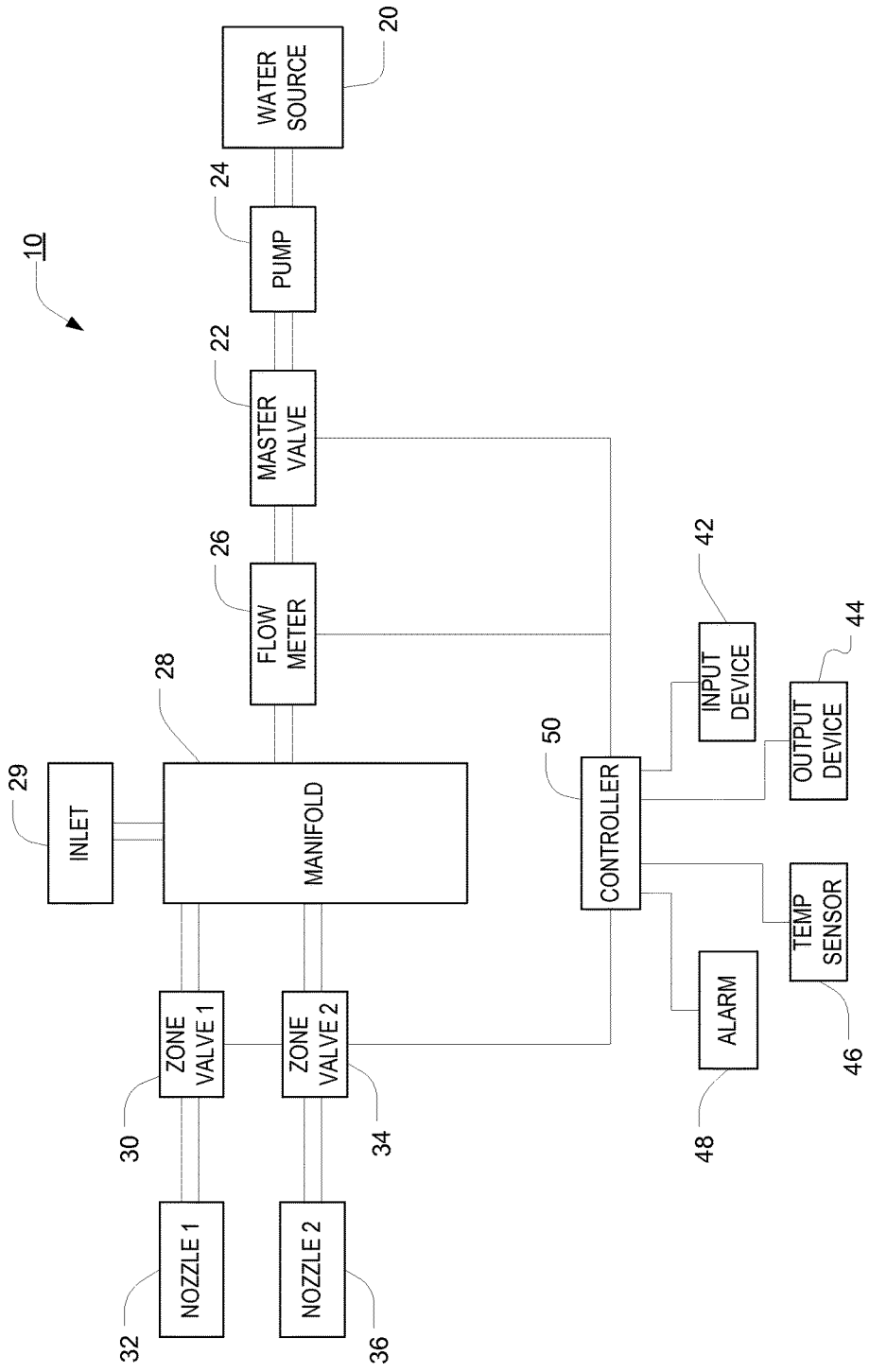
FIG. 2 is a block diagram of the system for promoting activity in poultry shown in FIG. 1.

Referring to FIG. 2, illustrated therein is a block diagram showing various components of the system 10. The system 10 comprises a water source 20, connected to a master valve 22, a pump 24, a flow meter 26, a manifold 28, an inlet 29, zone valves 30 and 34, and the nozzles 32 and 36. The system 10 also comprises a controller 50 operatively connected to the master valve 22, zone valves 30 and 34, the flow meter 26. The controller 50 is also operatively connected to an alarm 48, a temperature sensor 46, an output device 44 and an input device 42.

The water source 20 is connected to the pump 24. The water source 20 provides water to the system 10, and may be linked to the municipal water system or any other source of water that may be available to the poultry house 12. In other embodiments, the water source may provide water with additives and/or any other type of fluid.

The pump 24 is used to provide additional water pressure. In other embodiments, if there is sufficient water pressure, it may not be necessary to use a pump to provide additional water pressure. The pump 24 may be a GJPS2A115-PKG pump manufactured by Grundfos. In other embodiments, other suitable means of increasing the water pressure may also be used.

The master valve 22 is connected to the pump 24 as shown. The master valve 22 controls the flow of the water from the water source 20 to the nozzles 32 and 36. The master valve 22 has an open position and a closed position. In the open position, the master valve 22 permits the water from the water source 20 to flow through. In the closed position, the flow of water through the valve is inhibited. The master valve 22, which is in addition to zone valves 30 and 34, serves as an added layer of control for limiting flow of water.

The master valve 22 may be an electronically controlled valve such as a solenoid valve. For example, the master valve 22 may be a ¾ inch AC inline glove valve with 24 VAC solenoid model #33-001 manufactured by Bermad Waterworks. The master valve 22 may also be another type of electronically controlled fluid control devices, such as a pneumatic valve. In other embodiments, the master valve 22 may be a hand-controlled valve that is not connected to the controller 50.

The master valve 22 is connected to the flow meter 26. The flow meter 26 provides a measurement of the volume of water that has been used by the system. This measurement may be used for monitoring purposes to determine total water usage of the system. The measurement may also be used to determine when to set one or more valves in the closed position as described herein below. In other embodiments, the flow meter 26 may not be used.

The flow meter 26 is connected to the manifold 28. The manifold 28 facilitates the water from the single water source 20 to flow to a plurality of valves. As shown, the manifold 28 is connected to the zone valve 1 and zone valve 2 as indicated by numerals 30 and 34 respectively. The zone valves 30 and 34 may be electronically controlled valves such as the master valve 22 or the like. In other embodiments, there may be a different number of zone valves. The manifold 28 may also be connected to the inlet 29 as shown. The inlet 29 allows additives to be added to the water for various purposes such as cleaning the sprinkler lines, pre-soaking the litter with cleaning agent, other litter treatments, manure pit treatments, and odor control.

The zone valve 30 is connected to the nozzle 32. As shown in FIG. 1, nozzle 32 is directed at the chicken 14 such that when the system 10 is activated, water from the water source 20 is sprayed at the chicken 14 through the nozzle 32. Similarly, the zone valve 34 is connected to the nozzle 36, which is directed at the chicken 15.

As shown, each of the valves 30 and 34 is connected to a single nozzle 32 and 36 respectively. In other embodiments, it is possible connect multiple nozzles to each valve, with each valve defining a zone of operation. By organizing the nozzles in zones, it is possible to control operation of multiple nozzles in each zone. The number of nozzles in a zone may be limited by the amount of available water pressure as the water pressure at each nozzle is inversely related to an increase in the number of nozzles connected to each valve. In other embodiments, it may also be possible to use multizone valves instead of having multiple valves.

Each of the nozzles 32 and 36, for example, may be a spinner assembly comprising a model AT77-930212 spinner, a AT77-930509 nozzle, a AT77-930100 bridge, and a AT77093120 leak prevention device manufactured by Dan Sprinklers. In other embodiments, the nozzles 32 may be other types of nozzles. For example, nozzles manufactured by DIG Corporation or Netafim may be used. Nozzles may be selected to permit customization of sprinkler drops to avoid obstacles such as heaters, tunnel curtains, circulation fans, feed hoppers, and lights by sprinkling over or under the obstacles.

In other embodiments, the system 10 may also include sprinkler deflectors to avoid sprinkling unwanted areas such as circulation fans, feed hoppers, electrical boxes, etc. The sprinkler system may also include sprinkler plugs to keep an area temporarily free of sprinkling.

The system 10 comprises a controller 50 which is connected various components of the system 10. The controller 50 is connected to the master valve 22, the zone valve 30, and the zone valve 34. The controller 50 may be wired to the valves such that electrical signals may be received at the valve, and interpreted to control the operation of the valve by either setting the valves in the open position or the closed position. The controller 50 is wired to each valve such that it is possible to control the operation of each valve individually. The controller 50 is also connected to the flow meter 26 for obtaining measurements from the flow meter 26.

Figure 3:
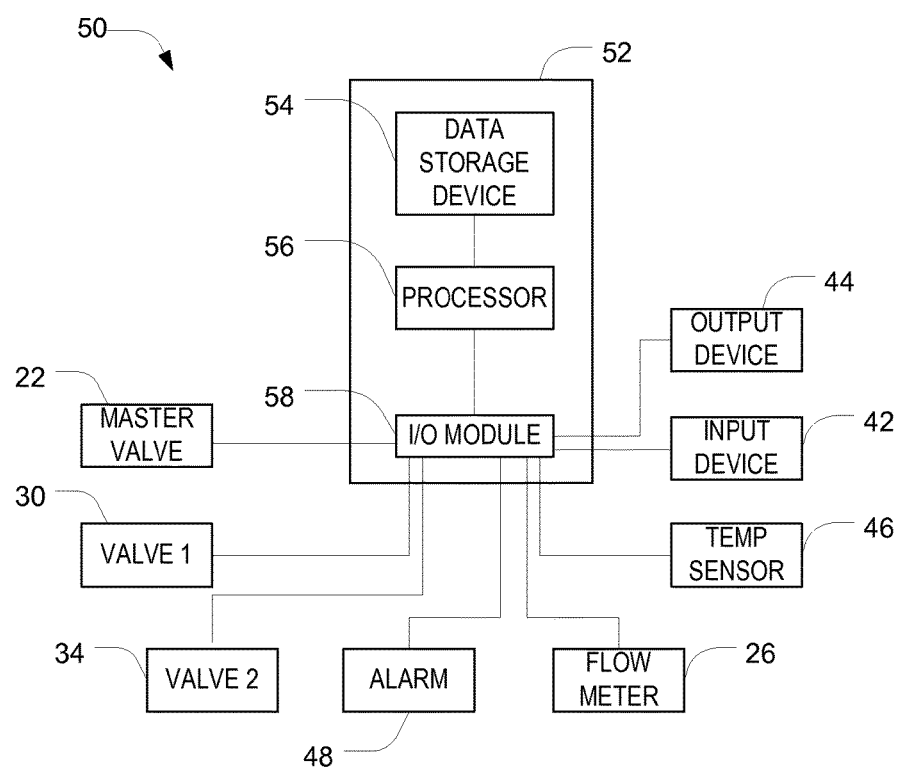
FIG. 3 is a block diagram of the controller shown in FIG. 1.

Referring now to FIG. 3, illustrated therein is a block diagram of the controller 50 according to one embodiment. The controller 50 comprises at least one data storage device 54 operatively connected to at least one processor 56. The data storage device 54 may store instructions for programming the processor 56. The data storage device 54 may also store configuration settings for the controller 50.

In some embodiments, there may be more than one data storage device 54. The data storage device 54 may be volatile or non-volatile computer memory. If there are more than one data storage devices, the data storage devices may be different types of memory. For example, the type of memory for storing instructions to program the processor 56 may be different from the type of memory for storing configuration settings of the controller 50.

The controller 50 includes an input/output module 58 operatively connected to the processor 56. The input/output module 58 facilitates communications between the processor 56 and the components of the system 10 that the controller 50 is connected to. The input/output module 58 may also facilitates communication between a user of the system and the controller 50. In the embodiment as shown, the input/output module 58 is connected to the master valve 22, the zone valves 30 and 34, the alarm 48, the flow meter 26, the temperature sensor 46, the input device 42 and the output device 44.

The input/output module 58 may be a single unit or a combination of multiple different units. The input/output module 58 may comprise a digital to analog converter, and/or an analog to digital converter depending on the component that it is connected to. For example, the input/output module 58 may include a digital to analog converter to connect to the master valve 22, and the zone valves 30 and 34 such that the digital instructions to change the state of the valves between the open and close positions may be communicated to the valves through an electrical wire by varying the current or the voltage.

The controller 50 may include a housing 52 for housing one or more components of the controller 50. The housing 52 may be manufactured from plastic, metal or any other suitable material. The housing 52 insulates various components of the controller 50 from potentially harmful elements in the environment such as dust and moisture. In the embodiment as shown, the housing 52 houses a memory 54, a processor 56, and an input/output module 58. In other embodiments, another combination of the components of the controller 50 may be found outside the housing 52. In other embodiments, a housing may not be used at all. In other embodiments, some of the components may be integrally formed with the housing 52. The housing 52 is configured permit wires or other connectors to access the input/output module 58.

Figure 4:
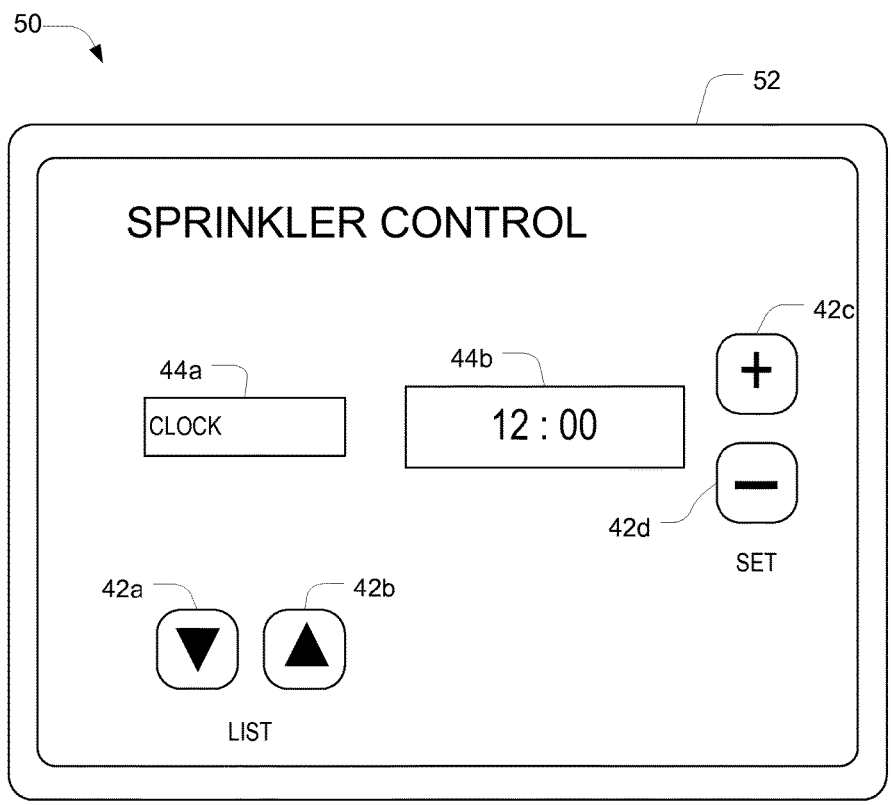
FIG. 4 is a top view of a front of the controller shown in FIG. 1.

Referring now to FIG. 4, illustrated therein is a top view of an exemplary housing 52 according to one embodiment of the invention. The housing 52, in this embodiment, has input device 42 in the form of buttons 42a-42d integrated to the housing. These buttons may be used to provide user input to the controller 50. The user input may be used to determine settings for the controller 50 such as the duration of the activity promotion interval, the start time of the activity promotion interval, and/or the frequency of the activity promotion interval. The exemplary housing 52 also has output devices 44 in the form of a LCD display 44a and a LED display 44b. The LCD display 44a indicates what the numerical value displayed in the LED display 44b represent. As shown the number "12:00" represents the time (12:00 am) in a 24 hr format. Other parameters may be viewed by using the "List" buttons 42a and 42b to toggle through a list of available parameters. Some of the parameters may be adjusted by using the "Set" buttons 42c and 42d.

The processor 56 may be a programmable microprocessor. For example, the microprocessor may be a Core 100 Model X1255 microprocessor. The processor 56 controls the operation of the valves 22, 30 and 34 connected to the controller 50 by providing control signals through the input/output module 58 to each of the valves 22, 30, and 34 to indicate whether the valves should be in the open position or the closed position. Each of the valves 22, 30, and 34 may be controlled individually. To permit flow of water from the water source 20 to the poultry 14 and 15, the master valve 22 and at least one of the zone valves 30 and 34 must be in the open position.

The processor 56 is programmed to set the valves in an open position at a start of an activity promotion interval, and to set the valve to the closed position at the end the activity promotion interval. The activity promotion interval starts when the valves are set in the open position such that a sufficient amount of fluid is dispersed through the sprinkler nozzles 32 and/or 36 at the poultry to promote physical activity in the poultry. The valves are then set in the closed position at the end of the activity promotion interval before an excessive amount of fluid is dispersed into the poultry house 12.

The poultry naturally prefer to remain in a seated state. Being in a seated position for long periods may result in an uneven distribution of heat in the poultry as the area between the poultry and the floor tends to be warmer than the rest of the poultry. It is desirable to alleviate the uneven distribution of heat in the poultry by encouraging the poultry not to be in the seated position periodically to permit the heat trapped between the poultry and the floor poultry house to escape.

When a sufficient amount of fluid is dispersed at the poultry, the poultry is prompted to get up and move towards the watering trough 16 to consume water. Increased water consumption may be beneficial to the health of the poultry. Prompting the poultry to get up and move towards the watering trough 16 also promotes physical activity in the poultry. That is, the system may be used to exercise the poultry, and the act of exercising may be beneficial to the health of the poultry. In some embodiments, the sprinkler system may be used to promote water consumption by the poultry. The poultry also release heat trapped between the poultry and the floor, which cools the poultry as the poultry get up from their resting position.

In addition, dispersing fluid into the poultry house may also inhibit the dust levels within the poultry house. This may reduce chance of bacterial infection in the respiratory track of the poultry in the poultry house.

Referring to FIG. 5, illustrated therein is a table 70 listing at least some of the factors that may affect the duration and/or the frequency of the activity promotion interval. The duration of the activity promotion interval is selected such that a sufficient amount of water is dispersed for activity promotion without over-watering the poultry house 12. The start of each activity promotion interval is predetermined based on a frequency of operation parameter indicative of the number of times the activity promotion interval is ran in a given period of time. For example, the activity promotion interval may occur 10 times in a given 10-hour window. In that case, the start time may be evenly distributed by dividing the given period of time with the number times the activity promotion interval is being ran, which results in the activity promotion interval being ran once every hour. In other examples, the start time may not be evenly distributed.

A value for the frequency of operation parameter is selected to promote the rate of growth of the poultry. The rate of growth may be affected by a number of different factors. For example, to promote growth of the poultry, it may not be desirable to run the activity interval when the age of the flock of poultry is below a certain growth day. Accordingly, the frequency of operation value may be selected based on the age of the poultry being housed.

The value of the frequency of operation may differ based on purposes for which the poultry is being raised. For broiler chickens, the activity promotion frequency value may be set at 10 times a day after the chickens are 21 days old, and the activity promotion interval not run (i.e. frequency set to 0) when the chickens are younger than 21 days. For breeding chickens and breeding turkeys, the frequency value may be set at 10 times a day after these chickens and turkeys are 12 weeks old, and the activity promotion interval not run prior to that age.

The value of the frequency of operation may differ based on different types of poultry to promote growth of different types of poultry. For example, the value for the frequency of operation for turkeys may be different from that for chickens. The sex of the poultry may also affect the duration of the activity promotion interval.

Depending on different factors, the value of the frequency of operation may range from 0 times a day to 20 times a day. Typically, the value of the frequency of operation ranges from 0 times a day if the poultry is younger than a certain age, and 10 times a day once the poultry is older than the selected age as described above. In other embodiments, the frequency of operation may occur for a different range.

The start time of the activity promotion interval may also be predetermined based on time of day. For example, it may be undesirable to disturb resting poultry at nighttime by activating the sprinklers. As such, the start time of the activity promotion interval may be limited to daylight hours. For example, the start time may be between 6:00 in the morning to 19:00 hr in the evening in some areas. It is also possible that the frequency of operation may vary based on the current time of a day. For example, the frequency of operation may increase between 6:00-9:00 hr and 16:00-19:00 hr to promote more physical activity during the early morning and later evening.

As stated above, the duration between the start and the end of the activity promotion interval is selected so as to promote physical activity in the poultry without dispersing an excessive amount of water into the poultry house 12. It is possible that if only a small amount of water is sprayed at the poultry, the poultry may not be stand up and move around. On the other hand, if too much water is sprayed at the poultry, it will accumulate at the floor of the poultry house 12, which is undesirable. Accordingly, it is desirable to select an appropriate duration of the activity promotion interval such that the amount of water dispersed is sufficient to promote physical activity without over-watering the poultry house 12.

The duration of the activity promotion interval may be selected based on the type of poultry being housed to promote physical activity in the poultry. For example, the duration may be 20 seconds for chickens, ducks, and geese, and the duration may be 30 seconds for turkeys. The sex of the poultry may also affect the duration of the activity promotion interval. The duration of the activity promotion interval may range from 15 seconds to 45 seconds depending on the type of the poultry being housed.

In addition to operating activity promotion intervals, the processor 56 may be further programmed to set the valve in an open position at a start of a cooling interval, and set the valve to the closed position at an end the cooling interval for the purpose of cooling the poultry house 12. During the cooling interval, a sufficient amount of fluid is dispersed through the sprinkler nozzle to reduce the temperature within the poultry house 12. As stated before, this may cause the poultry to stand-up, which releases heat that is trapped between the poultry and the floor. The droplets of fluid on the birds combined with rapid air movement will also help to lower the bird's body temperature. The start of the cooling interval is determined based on the temperature value of the poultry house 12, which is obtained through the temperature sensor 46.

The duration of the cooling interval may differ based on the temperature of the poultry house 12. For example, the duration of the cooling interval may be 20 seconds if the temperature is between 80-84 degrees Fahrenheit, 40 seconds for 85-89 degrees Fahrenheit, and 60 seconds if is over 89 100 degrees Fahrenheit. In other embodiments, the duration of the cooling interval may be constant. The frequency of the cooling interval may be increased depending on the temperature of the poultry house 12. For example, the frequency of the cooling interval may be once every 30 minutes for temperatures between 80-84 degrees, once every 15 min for 85-89 degrees, and once every 5 min if the temperature is over 89 degrees Fahrenheit. In cases of extreme heat stress, the frequency of operation of the cooling mode may be as much as 192 times in a 24 hour period.

The processor 56 may be operating both cooling and activity promotion intervals. It is possible that if both intervals are run in close succession, too much water may be dispersed into the poultry house 12. To prevent the activity promotion interval and cooling interval from running in short succession, a shared countdown timer may be used.

In one embodiment, the processor 56 may be programmed to start the activity promotion interval based on a count down timer. For example, the timer value may be initially set at 60 minutes. The timer will then count down, and when the value reaches "0", the processor 56 will start the activity promotion interval. The timer will then be reinitialized to 60 minutes at the end of the activity promotion interval, thereby providing a 60-minute wait before the activity promotion interval starts again. That is, the activity promotion interval is ran every hour. In other examples, the value of the timer may be different based on the frequency of the activity promotion interval. To prevent an activity promotion interval from starting to soon after a cooling interval, the processor 56 may be further programmed to reset the timer after a cooling interval, such that the activity promotion interval may not operate for the time remaining in the timer before starting another activity promotion interval.

Referring back to FIG. 2, the system 10 may also include an alarm 48, which may be connected to the controller 50 as shown. The alarm 48 may provide an audible sound, or provide some other way of alerting a user of the system. The alarm may be based on the measurement provided by the flow meter.

The controller 50 is also connected to the flow meter 26. The information from the flow meter 26 may be used by the controller 50 to prevent dispersing more than a desired amount of water. The flow meter 26 may be used to provide a measurement of the total amount of fluid that has flowed through the fluid counter over a period of time, which can be used for water usage monitoring purposes. An exemplary flow meter 26 that may be used is 73WM055 3/4 water meter with pulse made by Arad. This information can be provided to the controller 50 through the I/O module 58. The processor 56 may be programmed to use this information to provide an additional check as not to disperse undesired amount of water at the poultry house 12. For example, the processor 56 may be programmed to set the valve in the closed position if the measurement from the fluid counter reaches a specified value. In other embodiments, a volumetric valve may also be attached to the system to provide a limit for the water expelled through the nozzles in cases of system or human error. For example, Bermad Waterworks 0-2600 gallon volumetric valve may be used.

Figure 6:
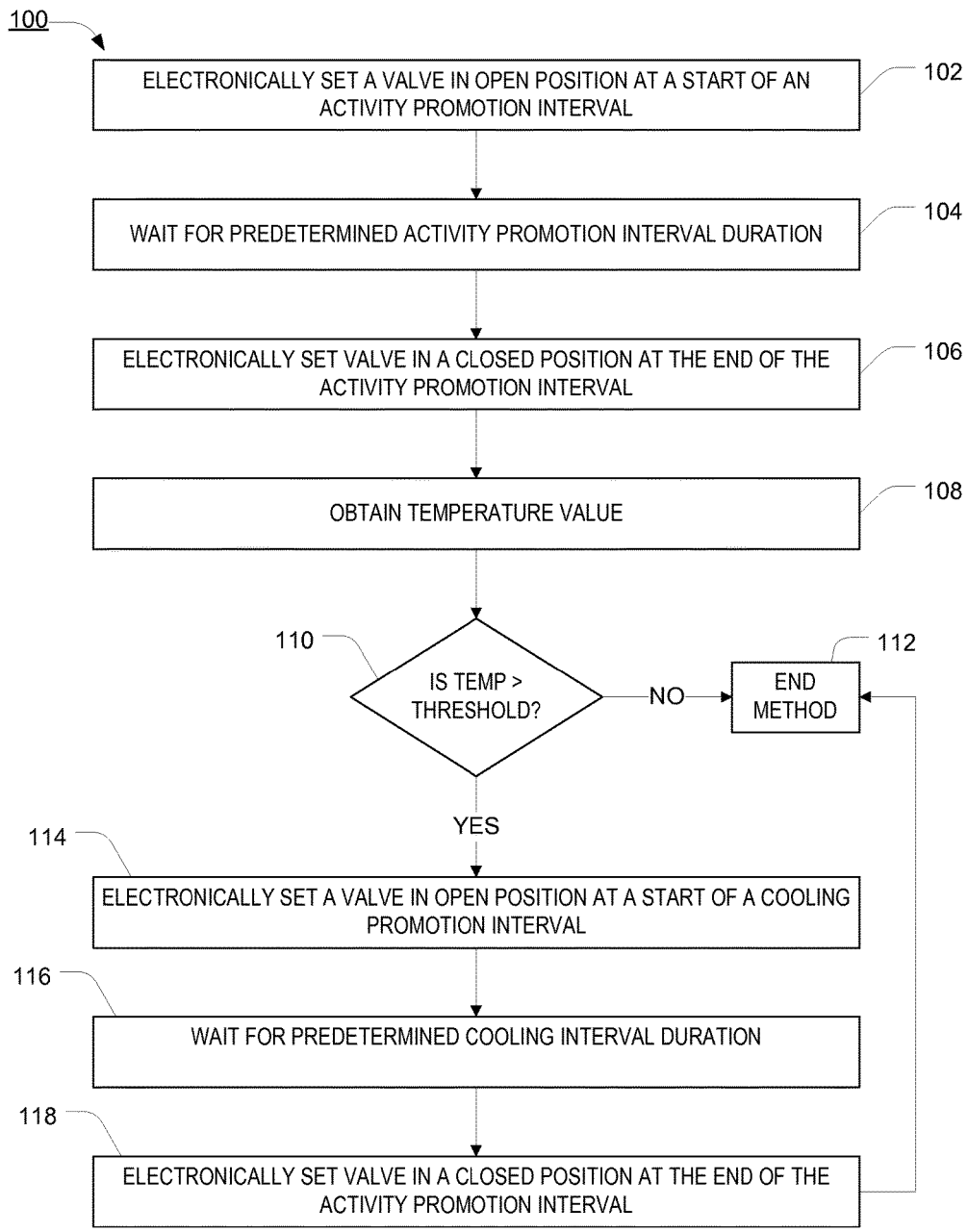
FIG. 6 is a block diagram illustrating the steps of a method for promoting activity in poultry according to another embodiment.

Referring now to FIG. 6, illustrated therein is a method 100 for promoting physical activity of poultry in a poultry house according to one embodiment of the invention. The method 100 may be performed by a controller such as the controller 50 described above.

The method 100 begins at step 102. At step 102 the method 100 electronically sets a valve in an open position to permit fluid to flow through the valve at a start of an activity promotion interval. The valve is connected to the fluid source and at least one sprinkler nozzle directed at the poultry. The valve controls a flow of fluid between a fluid source and the at least one sprinkler nozzle.

In some embodiments, there may be more than one valve. The valve used by the method 100 may be the valve 22, 30 or 34 as described above, or similar valves. In other embodiments the valve used by the method 100 may be different from the valves 22, 30, and 34. The sprinkler nozzle connected to the valve in the method 100 may be similar to the sprinkler nozzles 32, and 36 described above, or the like. In other embodiments, the sprinkler nozzle used by the method 100 may be different from the nozzles 32 and 36. The fluid source in the method 100 may be a water source similar to the water source 20 described above or the like. In other embodiments, the fluid source in the method 100 may be different from the water source 20.

The start of the activity promotion interval may be determined by the frequency of operation parameter indicative of a number of activity promotion intervals in a time period. The value for the frequency of operation parameter is selected to promote growth of the poultry. In some embodiments, selecting the frequency of operation parameter for the method 100 may be similar to selecting the frequency of operation parameter for the controller 50 as described above. That is, the value for the frequency of operation may differ based on a number of different factors, such as the factors illustrated in the table 70. For example, the value of frequency of operation may be selected based on the age of the poultry being housed. The value of the frequency of operation may also be selected based on different types of poultry to promote growth of the different types of poultry. The value of the frequency of operation may also differ based on desired weight of the poultry at the end of the growth cycle. The start time of the activity promotion interval may also be determined based on time of day, or the purposes for which the poultry is being raised.

The method 100 then proceeds to step 104. At step 104, the method 100 waits for the duration of the activity promotion interval. At this time, a sufficient amount of water is dispersed through the sprinkler nozzle at the poultry to promote physical activity in the poultry. After the method sets the valve in the open position, it waits for the duration of the activity promotion interval such that a sufficient amount of water is dispersed for activity promotion without over-watering the poultry house. This duration is selected to promote physical activity in poultry. In some embodiments, the duration of the physical activity promotion interval may be similar to the duration between the start and the end of the activity promotion interval that the processor in controller 50 is programmed to perform as described above. The duration of the activity promotion interval may also be affected by the factors illustrated in table 70.

The method 100 then proceeds to step 106. At step 106, the method 106 electronically sets the valve in a closed position to inhibit flow of fluid between the water source and the at least one sprinkler nozzle at the end of the activity promotion interval.

In addition to the activity promotion mode, the method 100 may also be operating in a cooling mode. If the method 100 is also operating in a cooling mode, the method 100 proceeds to step 108. At step 108, the method 100 obtains a temperature measurement from a temperature sensor. The temperature measurement is indicative of the temperature of the poultry house. The method proceeds to step 110.

At step 110, the method 100 determines whether the temperature value of obtained in step 108 exceeds at least one predefined threshold. For example, the predefined threshold may be 80, 84 or 89 degrees Fahrenheit. If it is determined that the temperature exceeds the at least one predefined threshold, the method 100 proceeds to step 110. If it is determined that the temperature does not exceed the predefined threshold, the method 100 ends at step 112.

At step 114, the method 100 electronically sets the valve in the open position at a start of a cooling interval. In some embodiments, the cooling interval performed by the method 100 may be similar to the cooling interval that the processor 56 in the controller 50 is programmed to perform as described above.

At step 116, the method 100 waits for a predetermined duration of the cooling interval. As stated above, the duration and/or the frequency of the cooling interval may differ based on the temperature of the poultry house.

At step 118, the method 100 sets the valve to the closed position at an end the cooling interval to prevent an excessive amount of fluid from being dispersed into the poultry house. As such, the method 100 balances between dispensing sufficient amount of water through the sprinklers to cool the poultry and the poultry house without over-soaking the poultry house.

Referring now to FIG. 7, illustrated therein is a method 150 for promoting activity in a poultry house according to another embodiment of the invention. The method 100 begins at step 152.

At step 152, the method 100 initializes a countdown timer based on a frequency of operation value for the activity promotion interval. For example, the countdown timer may be set to 60 minutes if the frequency of operation value is once every hour. The frequency of operation may be affected by various factors such as the type of poultry, the age of the poultry, the purpose of the poultry, as described above. The method 150 proceeds to step 154

At step 154, the method 100 determines whether the current day is equal to or after the activity promotion interval start day. The activity promotion start day is the age of the poultry after which the activity promotion mode operates. The start day of the activity promotion interval may depend on the type of poultry being housed, and the purpose for it is housed. For example, for broiler chickens the activity promotion starts operation after the chickens are 21 days old. In another example, if the poultry comprise chickens and turkeys used for breeding, the activity promotion interval starts when the poultry is 12 weeks old. If it is after the activity promotion start day, the method 150 proceeds to step 164. Alternatively, the method 150 proceeds to step 156.

At step 156 the method 150 determines whether the current time is within operational time of day activity promotion interval. That is, the method 150 determines whether the current time is at the time of day when activity promotion interval may operate. For example, this could be between 06:00 hr-16:00 hr. If the current time is not within the daily activity promotion interval operation time, the method 150 proceeds to step 164. Alternatively, the method 150 proceeds to step 158.

At step 158, the method 150 determines if the value of the countdown timer is 0. If the value of the count down timer is not 0, the method 150 proceeds to step 164. Alternatively, the method 150 proceeds to step 160.

At step 160, the method 150 operates the activity promotion interval. That is, the method 150 electronically sets a valve in an open position to permit fluid to flow through the valve at a start of an activity promotion interval. The valve controls a flow of fluid between a fluid source and at least one sprinkler nozzle directed at the poultry.

In some embodiments, there may be more than one valve. The valve used by the method 150 may be the master valve 22, zone valves 30 and 34 as described above or similar valves. In other embodiments the valve used by the method 150 may be different from the valves 22, 30, and 34.

The sprinkler nozzle connected to the valve in the method 150 may be similar to the sprinkler nozzles 32, and 36 described above, or the like. In other embodiments, the sprinkler nozzle used by the method 150 may be different from the nozzles 32 and 36. The fluid source in the method 150 may be a water source similar to the water source 20 described above or the like. In other embodiments, the fluid source in the method 100 may be different from the water source 20.

The method 150 then waits for a predetermined duration of the activity interval, the duration being selected such that a sufficient amount of fluid is dispersed through the sprinkler nozzle at the poultry to promote physical activity in the poultry without over soaking the poultry house. In some embodiments the duration of the physical activity promotion interval may be similar to the duration between the start and the end of the activity promotion interval that the processor in controller 50 is programmed to perform in the embodiment as described above. The duration of the activity promotion interval may be affected by the factors illustrated in table 70.

The method then electronically sets the valve to a closed position to inhibit fluid from flow through the valve at the end of the activity promotion interval to prevent an excessive amount of fluid from being dispersed into the poultry house. After the activity promotion interval is ran, the method 150 proceeds to step 162.

At step 162, the method 150 reinitializes the countdown timer based on the frequency of operation parameter indicative of a number of activity promotion intervals in a time period. The value for the frequency of operation parameter is selected to promote growth of the poultry. In some embodiments, selecting the frequency of operation parameter for the method 150 may be similar to selecting the frequency of operation parameter for the controller 50 as described above. That is, the value for the frequency of operation may differ based on a number of different factors, such as the factors illustrated in the table 70. For example, the value of frequency of operation may be selected based on the age of the poultry being housed. The value of the frequency of operation may also be selected based on different types of poultry to promote growth of the different types of poultry. The value of the frequency of operation may also differ based on desired weight of the poultry at the end of the growth cycle. The start time of the activity promotion interval may also be determined based on time of day, or the purposes for which the poultry is being raised.

The method 150 then proceeds to step 164. In some embodiments, the method 150 may wait for a predetermined amount of time (e.g. 30 minutes) before proceeding to step 164 such that the activity promotion interval and the cooling interval is not run in close succession.

At step 164, the method 150 determines whether the current day is equal to or after the cooling interval start day. The cooling interval start day is the age of the poultry after which the cooling interval may operate. In some embodiments, the cool start day may be set to "0" indicating that the cooling interval may run regardless of the age of the poultry. If it is after the cooling interval start day, the method 150 proceeds to step 168. Alternatively, the method 150 returns to step 154.

At step 168 the method 150 determines whether the current time is within operational time of day for cooling interval. That is, the method 150 determines whether the current time is at the time of day when cooling interval may operate. For example, this could be between 06:00 hr-16:00 hr. If the current time is not within the daily cooling interval operation time, the method 150 returns to step 154. Alternatively, the method 150 proceeds to step 170.

At step 170, the method 150 determines whether the current temperature of the poultry house is above a first threshold. The method 150 may use a temperature sensor to obtain the temperature value. For example, the first threshold may be 80 degrees Fahrenheit. If the temperature is not above the first threshold, the method 150 returns to step 154. Alternatively, the method 150 proceeds to step 172.

At step 172, the method 150 determines whether the current temperature of the poultry house is above a second threshold. For example, the second threshold may be 85 degrees Fahrenheit. If the temperature is not above the second threshold, the method 150 proceeds to step 174. Alternatively, the method 150 proceeds to step 176.

At step 174, the method 150 operates the cooling interval. That is, the method 150 sets the valve in the open position at a start of a cooling interval such that water from the water source may flow through the valve to the nozzles to be dispersed into the poultry house. It then waits for a predetermined duration of the cooling interval, the duration being selected such that a sufficient amount of fluid is dispersed through the sprinkler to reduce the temperature within the poultry house. It electronically sets the valve to the closed position at an end the cooling interval to prevent an excessive amount of fluid from being dispersed into the poultry house. The method 150 then proceeds to step 175.

At step 175, the method 150 reinitializes the countdown timer to a first value based on the first temperature threshold. For example, the countdown timer may be set to 30 minutes. By reinitializing the shared countdown timer, the method 150 prevents the sprinklers operating in the cooling interval and activity interval in a close succession. The method then proceeds to step 190.

At step 176, the method 150 determines whether the current temperature of the poultry house is above a third threshold. For example, the third threshold may be 90 degrees Fahrenheit. If the temperature is not above the third threshold, the method 150 proceeds to step 178. Alternatively, the method 150 proceeds to step 182.

At step 178, the method 150 operates another cooling interval. This cooling interval may be similar in duration to the cooling interval in method step 174. In another embodiment, the cooling interval may be of longer duration than the cooling interval step 174 since the temperature threshold is higher. After the cooling interval is ran, the method 150 proceeds to step 180.

At step 180, the method 150 reinitialize the countdown timer to a second value based on the second temperature threshold. For example, the countdown timer may be set to 15 minutes. In some embodiments, the second value may be the same as the first value in step 175. The method then proceeds to step 190.

At step 182, the method 150 operates in yet another cooling interval. This cooling interval may be similar in duration to the cooling interval in method step 174 and/or step 178. In another embodiment, the cooling interval may be of longer duration than the cooling interval step 174 and/or step 178 since the temperature threshold is even higher. After the cooling interval is ran, the method 150 proceeds to step 184.

At step 184, the method 150 reinitialize the countdown timer to a third value based on the third temperature threshold. For example, the countdown timer may be set to 5 minutes. In some embodiments, the second value may be the same as the first value in step 175, or the second value in step 180. The method then proceeds to step 190.

At step 190, the method waits until the value of the countdown timer is equal to "0". Method 150 then returns to step 164.

While the steps of the above methods have been described sequentially hereinabove, it should be noted that sequential performance of the steps may not need to occur for successful implementation of the method. As will be evident to one skilled in the art, rearranging sequence of performance of the steps, omitting the performance of some steps, or performing the steps in parallel may be possible without abandoning the essence of the invention.

While certain features of the invention has been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for promoting activity in poultry in a poultry house, comprising the steps of:
   a) electronically setting a valve in an open position to permit fluid to flow through the valve at a start of an activity promotion interval, the valve controlling a flow of fluid between a fluid source and at least one sprinkler nozzle directed at the poultry;
   b) waiting for a predetermined duration of the activity promotion interval, the duration being selected such that fluid is dispersed through the at least one sprinkler nozzle at the poultry to promote physical activity in the poultry; and
   c) electronically setting the valve to a closed position to inhibit fluid flow through the valve at the end of the activity promotion interval;
   d) wherein the start of the activity promotion interval is predetermined based on a frequency of operation parameter indicative of a number of activity promotion intervals in a time period, a value for the frequency of operation parameter being selected to promote growth of the poultry.

2. The method according to claim 1, wherein the value for the frequency of operation parameter is selected based on an age value indicative of the age of the poultry.

3. The method according to claim 1, wherein the value for the frequency of operation parameter is selected based on a type of poultry being housed.

4. The method according to claim 1, wherein the end of the activity promotion interval is selected based on a desired duration of the activity promotion interval for a type of poultry being housed to promote physical activity in the type of poultry being housed.

5. The method according to claim 1, wherein the start time of the activity promotion interval is determined based on time of day.

6. The method according to claim 1, further comprising the step of receiving at least one user input from a user input device to determine at least one of the duration, the start time and the frequency of the activity promotion interval.

7. The method according to claim 1, further comprising the steps of:
   a) receiving a temperature value of the poultry house from a temperature sensor;
   b) determining if the temperature value exceeds a first temperature threshold value;
   c) when the temperature value exceeds the first temperature threshold value, electronically setting the valve in the open position at a start of a cooling interval;
   d) waiting for a predetermined duration of the cooling interval, the duration being selected such that fluid is dispersed through the at least one sprinkler nozzle to reduce the temperature within the poultry house and to cool the poultry; and
   e) electronically setting the valve to the closed position at an end the cooling interval.

8. The method according to claim 7, further comprising the steps of using a timer to determine the start of the activity promotion interval and reinitializing the timer at the end of the activity promotion interval and at the end of the cooling interval.

9. The method according to claim 7, wherein the cooling interval is run at an increased frequency when the temperature value exceeds a second temperature threshold value, the second temperature threshold value being greater than the first temperature threshold value.

10. The method according to claim 7, further comprising the steps of obtaining a measurement of a volume of fluid dispersed through the at least one sprinkler nozzle using a flow meter and setting the valve in the closed position when the flow meter measurement exceeds a volume threshold value.

11. The method according to claim 7, further comprising the steps of obtaining a measurement of a volume of fluid dispersed through the at least one sprinkler nozzle using a flow meter and activating an alarm to alert a user when the flow meter measurement exceeds a volume threshold value.

12. The method according to claim 1, wherein at least one of the duration, the start time and the value for the frequency of the activity promotion interval is selected to promote health of the poultry.

13. A method for promoting activity in poultry in a poultry house, comprising the steps of:
   a) electronically setting a valve in an open position to permit fluid to flow through the valve at a start of each of a plurality of activity promotion intervals, the valve controlling a flow of fluid between a fluid source and at least one sprinkler nozzle directed at the poultry;
   b) waiting for a predetermined duration of the activity promotion interval, the duration being selected such that fluid is dispersed through the at least one sprinkler nozzle at the poultry to promote physical activity in the poultry;
   c) electronically setting the valve to a closed position to inhibit fluid flow through the valve at the end of the activity promotion intervals; and
   d) executing the activity promotion intervals a minimum number of times in a day independent of a temperature value indicative of the poultry being exposed to heat stress, the number being selected to promote growth of poultry.

14. The method according to claim 13, wherein the number of the activity promotion intervals is selected based on an age value indicative of the age of the poultry.

15. The method according to claim 13, wherein the number of the activity promotion intervals is selected based on a type of poultry being housed.

16. The method according to claim 13, wherein the number of activity promotion intervals is between 1 and 20 per day.

17. The method according to claim 13, wherein the number of activity promotion intervals is between 5 and 15 per day.

18. The method according to claim 13, wherein the number of activity promotion intervals is 10 per day.

19. A method for cooling a poultry house, comprising the steps of:
   a) receiving, from a temperature sensor, a temperature value based upon a temperature of the poultry house;
   b) determining if the temperature value exceeds a temperature threshold value;
   c) when the temperature value exceeds the temperature threshold value, electronically setting a valve in an open position at a start of a cooling interval;
   d) while the valve is in the open position, dispersing a fluid in the poultry house through at least one sprinkler nozzle connected to the valve;
   e) electronically setting the valve to a closed position at an end of the cooling interval; and f) obtaining a measurement of a volume of the fluid dispersed through the at least one sprinkler nozzle using a flow meter.

20. The method according to claim 19, further comprising the step of activating an alarm to alert a user when the flow meter measurement exceeds a volume threshold value.

21. The method of claim 19, wherein a duration of the cooling interval is selected such that fluid is dispersed through the at least one sprinkler nozzle to reduce the temperature of the poultry house and to cool the poultry.

22. The method of claim 19, wherein a duration of the cooling interval is selected such that the poultry rise from a seated position on a floor of the poultry house for a period of time to allow trapped heat to escape from between the poultry and the floor of the poultry house.

23. A method for cooling a poultry house, comprising the steps of:
   a) receiving, from a temperature sensor, a temperature value based upon a temperature of the poultry house;
   b) determining if the temperature value exceeds a temperature threshold value;
   c) when the temperature value exceeds the temperature threshold value, electronically setting at least one of a first valve and a second valve in an open position at a start of a cooling interval, wherein the first valve corresponds to a first zone in the poultry house and the second valve corresponds to a second zone in the poultry house;
   d) while at least one of the first valve and the second valve are in the open position, dispersing a fluid in the poultry house through at least one sprinkler nozzle connected to the first valve and the second valve;
   e) electronically setting at least one of the first valve and the second valve to a closed position at an end of the cooling interval.

24. The method of claim 23, wherein the at least one sprinkler nozzle comprises at least one first sprinkler nozzle connected to the first valve to disperse a fluid in the first zone, and at least one second sprinkler nozzle connected to the second valve to disperse the fluid in the second zone.

* * * * *